United States Patent [19]

Mitchell

[11] 4,133,345

[45] Jan. 9, 1979

[54] ATTITUDE INSENSITIVE VALVE

[76] Inventor: Clarence Mitchell, 17 Grant Ave. Box 7, Lakefield, Ontario, Canada, K0L-2H0

[21] Appl. No.: 804,797

[22] Filed: Jun. 8, 1977

[51] Int. Cl.² ............................................. F16K 31/18
[52] U.S. Cl. ................................ 137/446; 119/78; 222/509; 251/77; 251/251; 251/323; 251/339
[58] Field of Search ................. 137/434, 445, 446; 251/77, 82, 319, 323, 339, 251; 119/1, 78, 79, 80; 184/103 A, 103 R; 222/509

[56] References Cited

U.S. PATENT DOCUMENTS

| 627,448 | 6/1899 | Thomas | 137/446 |
|---|---|---|---|
| 1,327,734 | 1/1920 | Rassmann | 119/80 |
| 1,540,400 | 6/1925 | Kellan | 74/107 |
| 1,573,092 | 2/1926 | Russell | 251/40 |
| 2,710,594 | 6/1955 | Thompson | 251/339 |
| 2,806,638 | 9/1957 | Ziherl et al. | 222/509 |
| 3,941,094 | 3/1976 | Nilsen, Jr. | 119/80 |
| 3,988,001 | 10/1976 | Kankaras | 251/251 |

FOREIGN PATENT DOCUMENTS 1650275 8/1970 Fed. Rep. of Germany ............ 251/251

*Primary Examiner*—Martin P. Schwadron
*Assistant Examiner*—G. L. Walton

[57] ABSTRACT

A multi-purpose attitude insensitive valve has a mechanical actuating mechanism with a non-valving function to permit selective actuation of the valve by a variety of means. In addition to being substantially attitude insensitive the valve is adjustable in sensitivity by way of external adjustment with no disconnection of any portion of the valve.

7 Claims, 4 Drawing Figures

U.S. Patent  Jan. 9, 1979  4,133,345
FIG.1.
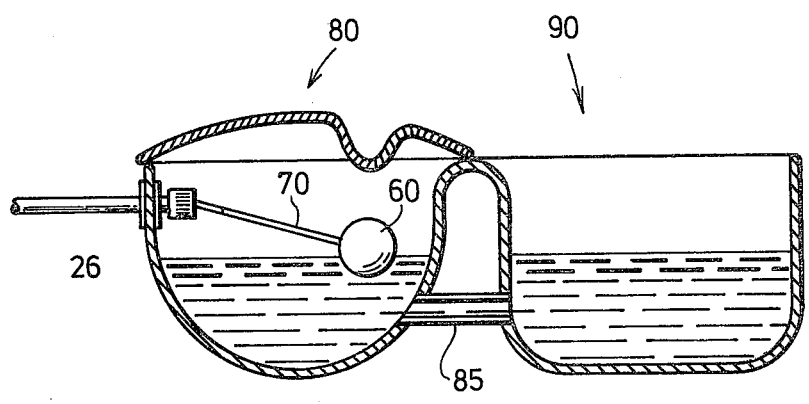
FIG.2.
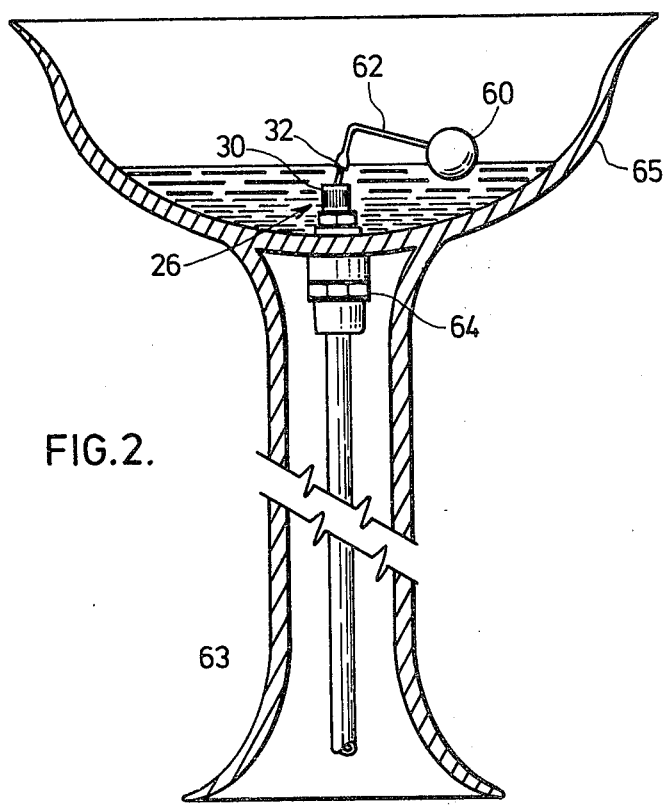
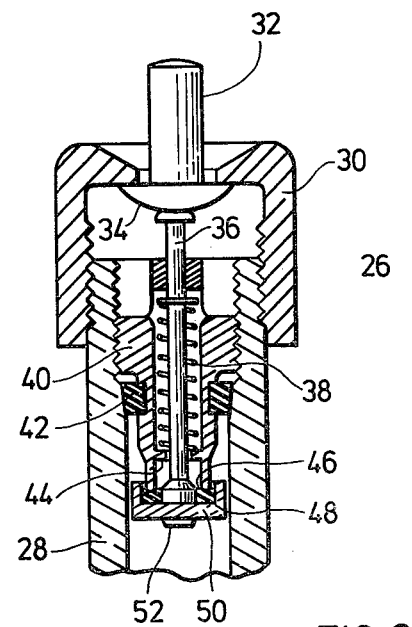
FIG.3.
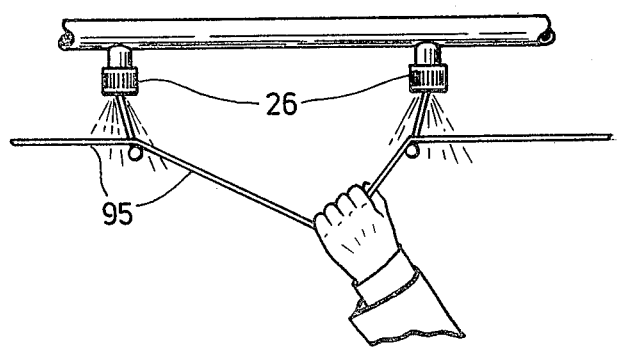
FIG.4.

ATTITUDE INSENSITIVE VALVE

This invention is directed to a flow control valve suitable for controlling the flow of fluids, particularly liquid, being spindle actuable by a variety of actuators.

Flow control valves are highly specialized, being generally developed for specific applications. Such specialization offers many functional advantages, but tends to raise costs unduly, because of the necessarily large scope of inventory that must be carried. Thus it can be seen that a multi-purpose valve which may be utilised in a variety of ways, with different modes of actuation and in a variety of attitudes, for differing purposes, offers a number of advantages in production and stock control.

Numerous valves of generally similar type exist, the majority of which rely upon the actuating mechanism to also provide a dual purpose in acting as a fluid release to provide a direct "valving" function.

The present invention provides an attitude insensitive valve suitable for actuation in a variety of modes, comprising an elongated body with an inlet at one end and an outlet at the opposite end, a valve seat within the body, stem mounted closure means, spring means biassing the closure means axially into sealing relation with the valve seat, the stem terminating within the body adjacent the outlet end, an outlet cap threadedly secured to said outlet end having an aperture therein to provide access to the body, an actuator spindle extending through the cap having a radial clearance therefrom to permit canting displacement of the spindle relative to the cap, spindle head means having a diameter greater than the cap aperture to produce axial inward displacement of the end of the spindle, upon canting of the spindle, and stem contact means on the spindle collar means to contact the stem in axial displacing relation therewith to permit flow of liquid through the valve.

The present invention further provides a cap axially adjustable over a range of movement to modify the relationship of the stem contact means with the stem.

The valve as herein disclosed is operable by way of a spindle to which a float or link means may be connected. The actuating spindle is generally characterised by providing variable actuation, and serves no sealing function.

Certain embodiments are described, reference being made to the accompanying drawings wherein:

FIG. 1 shows a sectional elevation of a drinking bowl incorporating the subject valve;

FIG. 2 shows a bird bath or fountain arrangement incorporating the subject valve;

FIG. 3 is a diametrical cross section of the valve per se with no actuator attachment, and FIG. 4 is a further arrangement of a plurality of valves interconnected by a tension linkage.

Referring to FIG. 1 the valve 26 is shown mounted in a double-bowl dispenser having an enclosed float compartment 80 and an open bowl portion 90, with an interconnecting conduit 85 extending therebetween in flow conducting relation. A float 60 connects by way of stem 70 with the valve 26 in flow activating relation therewith.

In the FIG. 2 arrangement a fountain or bird bath 65 has the valve 26 centre mounted with a float 60 connected by a curved stem 62 to the valve actuator spindle 32. A garden hose 63 connects by way of a regular threaded hose attachment 64, to supply water thereto.

In the FIG. 4 embodiment a plurality of spray heads 26 are provided of which only one pair are shown as being ceiling mounted, being interconnected by draw strings 95, indicated as being simultaneously manually operable. It will be evident that a series of such valves, covering a significant area could be so arranged. Furthermore, the arrangement could evidently be inverted for low level or ground operation.

Referring to FIG. 3, the valves 26 each comprises an elongated body portion 28 having a cap 30 threadedly attached thereto, through the centre of which extends an actuator spindle 32.

The spindle 32 has a mushroom-shaped head 34 which operates against the stem 36 of the valve.

A spring 38 serves to normally hold the stem 36 in outward extending relation, to hold the valve closure member 48 in sealing relation against valve seat 46.

The valve closure member 48 is secured to stem 36 by way of a cap 50 which is rivetted at 52 to form a unitary structure with stem 36.

An annular seal ring 42 seals the internal body portion 40 of the valve with the outer body portion 28 against leakage therepast.

In the position illustrated in FIG. 3, the valve cap 30 is positioned axially on the body portion 28 such that the head of stem 36 is in abutting relation with the head portion 34 of valve actuating spindle 32. Adjustment of cap 30 axially inwardly tends to compress the spring 38 and move the closure member 48 from off its seat. In the extreme the valve can be adjusted to a predetermined leakage rate, for a given head of internal pressure of the supply liquid, if so desired.

Movement of the cap 30 axially outwardly by an unscrewing motion serves to back the head portion 34 away from the stem 36, thereby introducing some lost motion into the function of spindle 32, while also changing the sensitivity of the valve in relation thereto.

In the case of the FIGS. 1 and 2 embodiments such adjustment can be used to vary the level of liquid within the respective bowls 75 and 65.

What I claim by Letters Patent of the United States is:

1. An attitude insensitive liquid release valve having an elongated body with an inlet at one end and an outlet at the opposite end, a valve seat within the body, stem mounted closure means, spring means biassing said closure means axially into sealing relation with said valve seat, said stem terminating within said body adjacent the outlet end, an outlet cap threadedly secured to said outlet end having an aperture therein to provide access to said body, an actuator spindle extending through said cap having a radial clearance therefrom to permit canting displacement of the spindle relative to the cap, spindle head means having a diameter greater than said cap aperture to produce axial inward displacement of the spindle upon canting of the spindle and stem contact means on said spindle head means to directly contact said stem in axial displacing relation therewith to permit flow of liquid through the valve.

2. The valve as claimed in claim 1 wherein said outlet cap is axially adjustable over a range of movement to vary the relationship of said stem contact means and said stem.

3. The valve as claimed in claim 1 including float means securing to the end of said spindle remote from said valve body.

4. The valve as claimed in claim 1 including link means connected to said spindle by the link means.

5. The valve as claimed in claim 2 including float means secured to the end of said spindle remote from said valve body.

6. The valve as claimed in claim 2 including link means connected to said spindle outside said valve body, to provide canting displacement of the spindle by the link means.

7. The valve as claimed in claim 3 said float means including a hollow shank portion to receive said valve spindle in entered relation therein.

* * * * *